Dec. 9, 1941.    S. R. THOMAS    2,265,554
BEARING
Filed Dec. 27, 1938
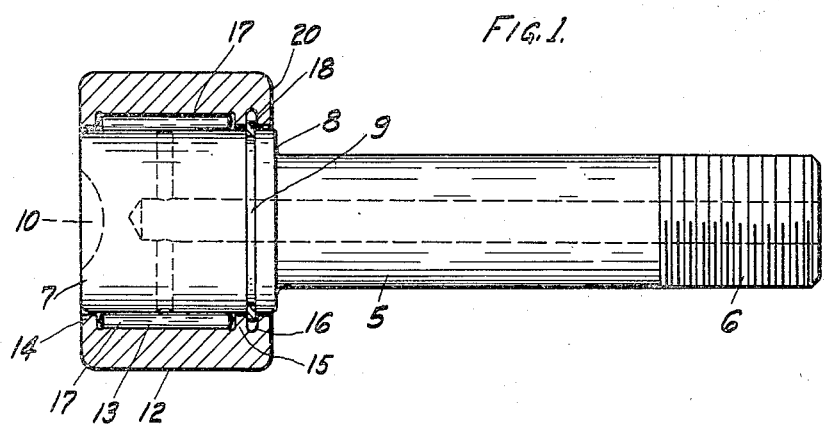
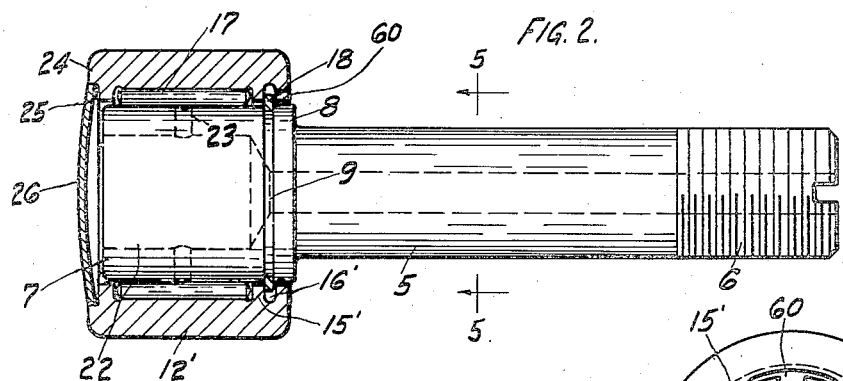
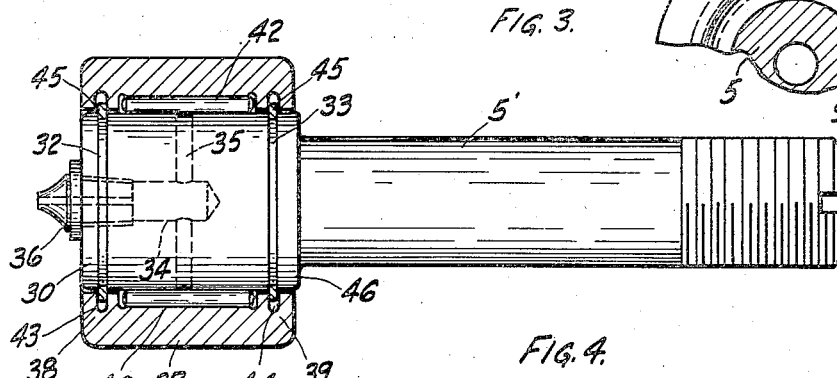
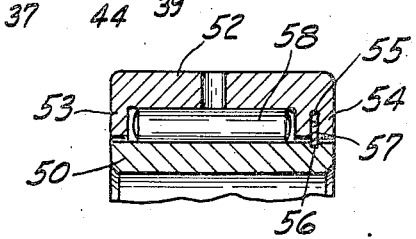
INVENTOR.
STANLEY R. THOMAS.
BY
ATTORNEY.

Patented Dec. 9, 1941

2,265,554

UNITED STATES PATENT OFFICE 2,265,554

BEARING

Stanley R. Thomas, Lyons, Mich., assignor to Bantam Bearings Corporation, South Bend, Ind., a corporation of Indiana Application December 27, 1938, Serial No. 247,751

5 Claims. (Cl. 74—569)

This invention in general relates to anti-friction bearings, but is more particularly directed to a bearing assembly for use as a cam follower or the like employing needle or roller bearings.

It is desirable in the use of cam followers or devices of similar nature that the construction be as simple as possible in order to reduce the cost thereof, but at the same time, the assembly must be capable of withstanding appreciable stresses in the use of the device since cam followers have substantially universal application and must be designed accordingly.

It has heretofore been known to provide a cam follower in which the inner bearing member forms the stud by which the cam follower is secured to an arm or a similar supporting member. However, in such constructions, it has been the practice to form a retaining flange at one end of the stud and to then progressively machine the stud on various diameters to produce the final construction. This requires utilizing a relatively large diameter piece of stock and cutting away an appreciable amount of metal in order to produce the final structure. Such operations involve considerable time, close machining of the surfaces to very limited tolerances, and the waste of an appreciable amount of metal. At the same time, the construction has the disadvantages of requiring the pressing on of a retaining washer or the like, and the chamfering of the edges of the washer and the bearing members in order to eliminate any cutting surfaces when the follower is finally assembled for operation.

The present invention has for one of its primary objects the provision of a simplified construction requiring the grinding of only a single diameter bearing surface and the utilization of a relatively simple type of locking structure for locking the outer and inner bearing races against relative axial movement. Further, the present construction does not require stock of any appreciably greater diameter than the final stud diameter required, and there is consequently very little waste of material.

Another feature of the present invention is the utilization of a locking assembly which is lubricated so as to prevent lateral wear and serves as a sealing end closure for the bearing assembly.

Other objects and advantages of the present invention will appear more fully from the following detailed description, which, taken in conjunction with the accompanying drawing, will disclose to those skilled in the art the particular construction and operation of the preferred form of the present invention.

In the drawing:

Figure 1 is a sectional view through one form of the present invention;

Figure 2 is a corresponding view through a modified form of the invention;

Figure 3 is a view of a still further modified construction;

Figure 4 is a partial sectional view of the invention as applied to a well-known type of roller bearing assembly; and Figure 5 is a sectional view taken on line 5—5 of Figure 2.

Considering the drawing in detail, in Figure 1 the bearing includes a stud 5 having the threaded end 6 whereby it may be secured to an arm or the like and having the head end 7 of slightly larger diameter than the stud 5.

Preferably, this member is formed by cutting stock having a slightly larger diameter than the portion 7 of the stud forming the bearing surface, to form the portion 7, and cutting the remainder of the stock to form the stud portion projecting therefrom. It will be noted that between the body portion of the stud and the head end 7 there is a radial shoulder 8 joined to the body portion by a slight fillet and having a chamfered radial outer edge leading onto the bearing surface 7.

This head end also is provided with an annular groove 9 cut therein adjacent the shoulder 8 for a purpose to be hereinafter described, and at its opposite end face is provided with a kerf 10 forming a screw driver slot whereby the stud may be assembled in position.

The outer bearing member comprises a bearing race 12 having an internal machined race portion 13 defined by radially inwardly directed flanges 14 and 15. The flange 14 determines the outer end of the race member 12, while the flange member 15 is provided with an annular radially directed groove 16 adapted to be positioned in substantial radial alinement with the groove 9. Within the race portion 13 defined by the flanges 14 and 15 are disposed anti-friction roller members 17, these members being needle bearings of any suitable or desired construction.

To lock the race member 12 against axial movement relative to the head end 7 of the stud 5, a suitable resilient locking ring 18 is provided which engages in the groove 9 and projects into the groove 16 of the race member 12, thereby holding these members against relative axial movement. Obviously the grooves and ring may be located at the opposite end of the assembly, if so desired.

Inasmuch as there is no appreciable axial thrust on a cam follower of this type, this locking member has been found sufficient to insure proper maintenance of the bearing race 12 on the head 7. Also, due to the relatively broad lateral contact between the bearing race 12 and the side walls of the ring 18, there will be no appreciable wear on the ring in the event that the cam follower is so mounted that there may be some axial thrust thereon. It will be noted that the groove 16 serves as a lubricant pocket for the end of the bearing, preventing wear on the locking ring 18 and also sealing the end of the bearing.

In the assembly of the construction as thus far described, the member 12 is first provided with the rollers or anti-friction members 17 which are held in position between the flanges 14 by means of a suitable lubricant which retains these rollers against displacement in the handling of the race 12. The clamping or locking ring 18 is then inserted in position, this ring being of the split type so that it may be expanded into the groove 16 in such manner as to provide an internal diameter of the ring greater than the external diameter of the head end 7 of the stud 5. The entire race assembly is then moved axially over the body portion of the stud, and the flange 14 is then moved past the shoulder 8 and over the head portion of the stud.

As the race member 12 is thus moved axially the ring 18 is expanded over the shoulder 8 and slides in expanded position along the surface of the head end 7 of the stud until it is located radially with respect to the groove 9, at which time the inherent resiliency of the ring will cause it to snap into the groove to lock the race 12 against further axial movement. Preferably, the depth of the groove 9 is such as to leave an appreciable amount of the radial thickness of the ring projecting into the groove 16 in order to provide adequate bearing of the ring in both the groove 9 and groove 16. The mechanism is thereby assembled in position without requiring any press fits or other additional structure. It will be noted that when in position the shoulder 8 projects outwardly of the end 20 of the race member 12 so that when the stud 5 is clamped in position against an arm bearing against the shoulder 8, there will be no interference or possible contact of the race member 12 with the radial surface of such a support that might tend to restrict the rotation of the race member 12 about the head end of the stud.

In Figure 2 I have shown a modified construction of sealing bearing, the stud 5 being formed exactly similar to the stud described in connection with Figure 1 but having the head 7 thereof bored to provide the reservoir 22 and passageways 23 providing lubricating ducts for radial passage of the lubricant through the ducts 23 to the anti-friction bearing members 17. The race member 12' of this construction is of substantially the same construction as the member 12, except that at its outer end it is slightly extended over the end of the head portion 7 of the stud, as indicated at 24, and is then counterbored as indicated at 25 to form a seat for a concave disc 26, which may be of the type known as a "Welch plug," that is forced into position to seal the end of the bearing. The opposite end of the race member 12' is provided with the flange 15' having the groove 16' therein in the same manner as described in connection with the Figure 1.

The construction is assembled in the same manner with the locking ring 18 snapping into the groove 9 to lock the race member 12' in position. However, before the disc 26 is pressed into position, the reservoir 22, ducts 23 and the bearings are completely filled with lubricant. When the disc 26 is then pressed into position, a substantially closed end sealed bearing construction is provided inasmuch as the groove 16' which receives the locking ring 18 serves as an end sealing means, to prevent axial escape of lubricant therepast, while maintaining the ring 18 amply lubricated to prevent wear thereon. The mounting of the stud 5 and the relationship of the shoulder 8 to the flange 15' is identical to that previously described, and also the operation of the construction is in nowise altered by reason of this sealing arrangement.

In order to disassemble the bearing in the event that such is required for inspection, repair or for some other reason, the flange 15' of the outer race member may have an arcuate cut-out portion 60 extending laterally to the groove 16' but of not quite the same radial extent as the groove. This provides access to the ends of the ring 18, allowing an expanding tool to be engaged therewith for expanding the ring and thereby moving it out of groove 9 in the head 7. As a result, the outer race member 12', with the roller bearings and ring, may be removed from the stud when desired.

Preferably, although not necessarily, the ends 62 of the ring may be notched to facilitate engagement of the expanding tool therewith. It is to be understood that this feature may be applied to all the embodiments of the invention disclosed, if so desired.

The construction shown in Figure 3 includes a stud 5' which has a head end portion 30 of larger diameter provided with axially spaced annular grooves 32 and 33 formed therein. The head end 30 of the stud is provided with an axially directed passageway 34 which, adjacent its inner end, is connected to the radially directed passageway 35. The outer end of the passageway 34 is closed by a lubricant fitting 36 of any usual or well known type, whereby lubricant under pressure may be forced into the passageways 34 and 35 by the use of a pressure lubricating gun in the usual manner.

The roller or outer race member 37 of this construction is provided with end flange portions 38 and 39 which define therebetween the bearing raceway 40 within which are mounted the anti-friction roller members 42. Each of the flanges 38 and 39 is provided with outwardly directed radial grooves 43 and 44, respectively, which, when the member 37 is assembled in position over the head end 30 of the stud, are in alinement with the grooves 32 and 33, respectively. Suitable locking rings 45 are provided in each of the grooves 43 and 44, and may be expanded in order to permit the axial movement of the race 37 over the head end of the stud until these rings move into alignment with the grooves 32 and 33, at which time they will snap into such grooves to thereby lock the race 37 in proper position.

With such a construction the rings 45 cooperate with the grooves 43 and 44 to provide, in effect, a labyrinth seal that will prevent entrance of dirt or the like into the bearing assembly while the lubricant fitting 36 will permit the packing of the roller assembly with proper lubricant for insuring anti-friction rolling contact between the member 37 and the head end of the stud 5'. It will be noted that the head end 30 of the stud has the radial shoulder 46 defining its inner edge, which shoulder projects slightly beyond the end face of the member 37 so as to insure that any arm or the like mounted on the stud will not contact with the outer roller 37.

In Figure 4 there is shown the invention as applied to a roller bearing assembly having the inner bearing race 50, and an outer bearing race 52 having end flanges 53 and 54. Between the flanges is formed the bearing raceway for the anti-friction rollers 58. The end flange 54 is provided with an annular groove 55 corresponding to the groove 16 of Figure 1, of a depth such as to accommodate expansion of the ring 57 when the outer race assembly is moved axially into position over the inner race 50. The inner race 50 has a corresponding groove 56 for receiving a portion of the ring 57 when the two grooves are alined. The groove 56 serves as a lubricant pocket in the same manner as described in connection with Figure 1. This type of construction can be used in all cases where there is no appreciable axial thrust.

It should be noted that by reason of the present invention, the bearing constructions disclosed have the advantage of always containing lubricant whether idle or running when in normal operative position. Further, the construction is so designed that there is no tendency to throw out lubricant when operating, thus conserving the lubricant and allowing the use of a packed type bearing.

A further advantage is the ability to disassemble the construction whenever required, this being accomplished by suitable means formed in the outer race member without any loss of strength or impairment of the operating characteristics of this member.

It has been found that with such a construction a very economical and simplified cam follower construction can be provided which will reduce materially the cost, and also simplify its assembly and facilitate sealing of the lubricant therein.

I am aware that various slight changes may be made in certain details of the construction herein shown and described, and I therefore do not intend to be limited except as defined by the scope and spirit of the appended claims.

I claim:

1. A cam follower comprising a stud having enlarged axially recessed head portion of constant external diameter, an annular groove adjacent one end of said head portion, an outer roller member having inturned end flanges encircling said head portion, an annular groove in one of said flanges, anti-friction rollers between said flanges supporting said roller on said head portion, a resilient ring carried in said flange groove and capable of snapping partially into said groove in said head portion to locate said roller member axially on said head portion, an axial recess in the other flange, and an imperforate disc seated in said recess and closing the end of the outer roller member over the open end of said head portion.

2. A cam follower comprising a stud having an enlarged tubular bearing head portion defined by a radial shoulder, an outer bearing race member having radially inturned end flanges, anti-friction rollers confined therebetween and engaging said head portion, annular grooves in one of said end flanges and in the bearing head portion, a snap ring engageable in both said grooves locking said race member against axial displacement relative said head portion and locating said shoulder axially beyond said race member, and a plug carried by the opposite end of said race member and closing the end of said tubular head portion.

3. A cam follower comprising a stud having a threaded shank portion and an integral enlarged cylindrical head portion, an annular groove adjacent one end of said head portion, a roller ring having inturned end flanges defining therebetween a bearing raceway, anti-friction rollers in said raceway supporting said ring on said head portion, said head portion having an enlarged axial recess for receiving lubricant, and radial ports leading from said recess to said raceway, a "Welch" plug seated in one end flange of said ring and closing said ring and recess, an annular groove in the other end flange, and a resilient ring extending partially into both said grooves to locate said roller ring against axial movement on said head portion and to provide a lubricant stop adjacent the opposite end of said roller ring.

4. A cam follower comprising a stud having a shank and an integral radially enlarged cylindrical head, forming a radial shoulder therebetween, an outer race member having radially inturned end flanges, one of said flanges having an annular groove, a corresponding annular groove adjacent the end of said head, a resilient ring extending partially into both grooves to lock said race member axially on said head with the end face thereof axially offset on the head side of said shoulder, an axially opening lubricant recess in said head including radial ports, rollers between said flanges rotatably supporting said race member on said head, and a spring disc plug seated in the opposite end flange of said race member.

5. A cam follower comprising a stud having an integral shank and an enlarged cylindrical head portion of uniform diameter separated from said shank by a radial shoulder, an outer annular race member having integral radially inturned flanges at the ends thereof of an internal diameter such as to fit closely around said head portion but allowing axial assembly of said race member over said head portion from the end of said stud opposite said shank, said race member having a plurality of anti-friction rollers confined therein between said flanges for rotatably supporting said race member on said head portion, an annular groove formed in said head portion adjacent said shoulder, an annular groove in the annular face of the associated end flange of said race member, and a resilient split ring carried in said last-named groove and expansible thereinto to move axially over said head portion, said ring being contractible upon radial alinement of said grooves to enter partially into said groove in said head portion for axially locating said outer race member on said head portion in a position spaced axially from said shoulder.

STANLEY R. THOMAS.